(12) United States Patent
Karir

(10) Patent No.: US 8,274,918 B2
(45) Date of Patent: Sep. 25, 2012

(54) METHOD FOR EXTENDING THE USE OF SINGLE IPV4 ADDRESSES TO MULTIPLE NETWORK END-HOSTS

(75) Inventor: Manish Karir, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 213 days.

(21) Appl. No.: 12/791,069

(22) Filed: Jun. 1, 2010

(65) Prior Publication Data

US 2010/0303078 A1    Dec. 2, 2010

Related U.S. Application Data

(60) Provisional application No. 61/182,916, filed on Jun. 1, 2009.

(51) Int. Cl.
*H04L 12/28* (2006.01)
(52) U.S. Cl. .................................. 370/254; 370/395.54
(58) Field of Classification Search .................. 370/252, 370/254, 255, 395.54, 392, 401
See application file for complete search history.

(56) References Cited

U.S. PATENT DOCUMENTS

| 6,822,957 | B1 | 11/2004 | Schuster et al. | |
|---|---|---|---|---|
| 7,222,188 | B1 | 5/2007 | Ames et al. | |
| 7,450,560 | B1 | 11/2008 | Grabelsky et al. | |
| 7,801,123 | B2 * | 9/2010 | Dharanikota et al. | 370/389 |
| 8,072,978 | B2 * | 12/2011 | Absillis | 370/392 |
| 2002/0052972 | A1 * | 5/2002 | Yim | 709/245 |
| 2002/0138596 | A1 | 9/2002 | Darwin et al. | |
| 2004/0057385 | A1 | 3/2004 | Roshko | |
| 2004/0064584 | A1 | 4/2004 | Mitchell et al. | |
| 2004/0139227 | A1 | 7/2004 | Takeda | |
| 2006/0274752 | A1 * | 12/2006 | Jain et al. | 370/392 |
| 2009/0154461 | A1 * | 6/2009 | Kitani et al. | 370/392 |

OTHER PUBLICATIONS

Sidrovs, Andris et al "SmartARP: Merging IP and MAC Addressing for Low-Cost Gigabit Ethernet Networks", Computer Networks, vol. 31 Issue 21 (1999).
Johnson, David "Routing in Ad Hoc Networks of Mobile Hosts", IEEE, First Workshop on Mobile Computing Systems and Applications (1994).

* cited by examiner

*Primary Examiner* — Hong Cho
(74) *Attorney, Agent, or Firm* — Harness, Dickey & Pierce, P.L.C.

(57) ABSTRACT

An address resolution system is provided where network devices are arranged to share a common public network address in a public network environment. The address resolution system includes: an address resolution table residing at a router and configured to store a public network address and a source port assigned to each network device registered with the router in connection with a hardware address that uniquely identifies each of the registered network devices; a port management agent residing on a given network device that is configured to receive a request to assign a source port to an application residing on the given network device and transmit the assignment request to the router; and an address resolution service residing at the router that is configured to query the address resolution table in response to the assignment request from the agent and transmit a reply to the agent based on results from the query of the address resolution table.

18 Claims, 4 Drawing Sheets

300

Modified ARP TABLE

| IP | DP | SP1 | SP2 | MAC |
|---|---|---|---|---|
| 192.168.1.1 | 80 | 3000 | 3010 | 00:AA:11:44:DD:EE |
| 192.168.1.1 | 80 | 3010 | 3020 | 00:11:22:33:44:55 |
| 192.168.1.1 | 25 | 4000 | 4000 | 00:66:AA:11:33:22 |
| 192.168.1.1 | 80 | 4050 | 4060 | 00:33:11:55:CC:BB |

METHOD FOR EXTENDING THE USE OF SINGLE IPV4 ADDRESSES TO MULTIPLE NETWORK END-HOSTS

CROSS-REFERENCE TO RELATED APPLICATIONS

This claims the benefit of U.S. Provisional Application No. 61/182,916, filed on Jun. 1, 2009. The entire disclosure of the above application is incorporated herein by reference.

FIELD

The present disclosure relates to method for extending the use of IPv4 addresses to multiple end-host network devices.

BACKGROUND

IPv4 address space is rapidly becoming scarce. It is anticipated that all currently available address blocks will have been allocated over the next two years. As this deadline approaches organizations will experience significant difficulties in expanding or growing their network operations.

Adoption of IPv6, which promises to make available a large range of new, longer IP numbers, continues to lag due to its complexity and cost. IPv6 requires that new routing hardware and new network services protocols must be adopted. The radically different addressing schemes introduced by IPv6 are also difficult for network operators entrenched in the IPv4 paradigm to understand. The goal of this invention is to expand and improve the utility of existing IPv4 address space.

Given the reluctance to adopt IPv6, several techniques have been developed to allow scarce IPv4 addresses to be shared by multiple devices. All of these techniques have led to compromises in security and undesirable changes in packet information and content.

The primary approach for IP address sharing is Network Address Translation (NAT). NAT is the most widely used technique to allow several network end-hosts share a limited set of IPv4 addresses. This approach relies on devices that modify IP addresses and port numbers in IP packets, as they are transmitted from the network end-host to the Internet.

NAT relies on a device placed in the path between the end-hosts and the Internet. Typically, the NAT device uses public IPv4 address space on the Internet facing side and private, non-routable IP addresses on the end-hosts. As a result of NAT's reliance on hardware appliances, it is difficult and costly to use NAT to support a large number of end-hosts.

In addition, the NAT device modifies packets transmitted from the end-host to the Internet and in each case replaces the private IP addresses in the packets with an address from the pool of available public addresses. Such modifications are similar in nature to the results of a "man-in the middle" attack from a network security perspective. Thus they severely limit the use of end-to-end security techniques. For example, these modifications make it impossible to trace a packet back to its original source. As a result, malicious transmissions can be effectively made untraceable with NAT and similar methods.

This section provides background information related to the present disclosure which is not necessarily prior art.

SUMMARY

An address resolution system is provided where network devices are arranged to share a common public network address in a public network environment. The address resolution system includes: an address resolution table residing at a router and configured to store a public network address and a source port assigned to each network device registered with the router in connection with a hardware address that uniquely identifies each of the registered network devices; a port management agent residing on a given network device that is configured to receive a request to assign a source port to an application residing on the given network device and transmit the assignment request to the router; and an address resolution service residing at the router that is configured to query the address resolution table in response to the assignment request from the agent and transmit a reply to the agent based on results from the query of the address resolution table.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

FIG. 3 illustrates an exemplary address resolution table; and

Figure 1:
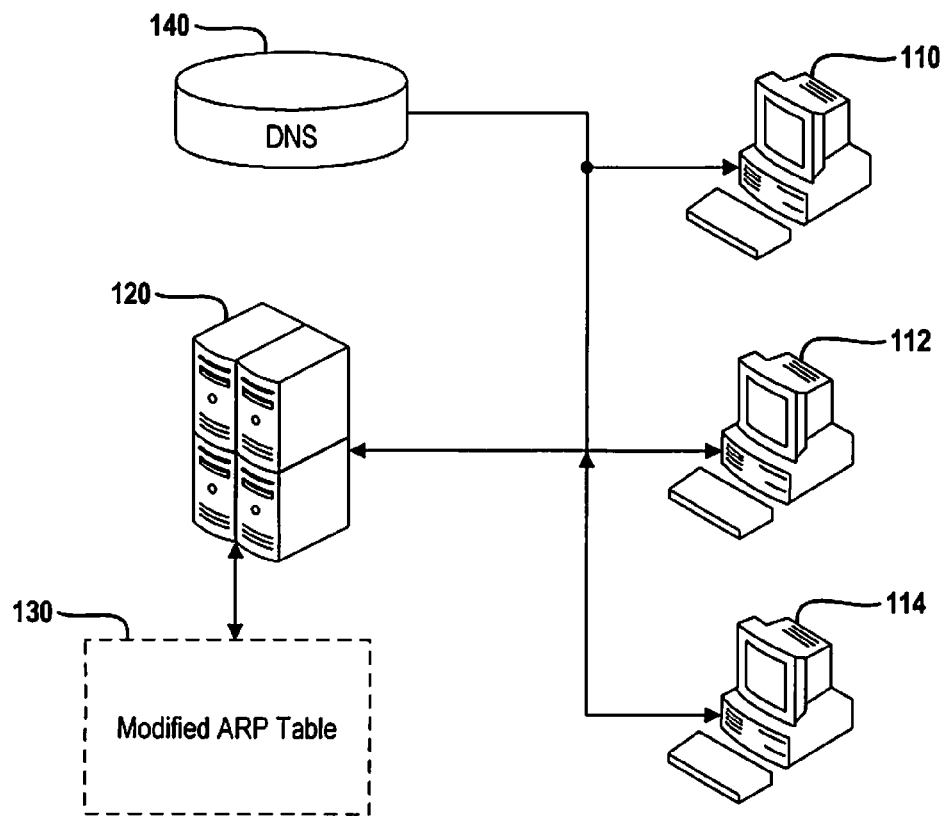
FIG. 1 is a diagram for an exemplary address resolution system.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 illustrates the four primary components for a port enhanced address resolution system (PEARS) implementing the disclosed method. The components of the PEARS include one or more software modules residing on end-host devices 110, 112, and 114, an address resolution service 140 and a modified address resolution table 120 residing on a router 120. Additional information about these components and their functions is presented below.

The software modules monitor and manage the port range usage by various applications on network end-hosts. The software module (i.e., computer executable instructions) resides on the network end-hosts or network devices in a public network environment. It is appreciated that the end hosts 110, 112, and 114 may all have the same IP address. Other types of public network addresses are also contemplated by this disclosure. A network end-host 110 is meant to include a desktop, workstation, server, laptop, PDA, phone, or other computing device or system, which utilizes an IPv4 address.

An address resolution table 130 at the local router maps IP addresses and port number ranges to a hardware address (e.g., MAC address) which is the physical identifier for an end-host. It is appreciated that the address resolution table 130 may be stored on a computer memory or other type of computer readable medium associated with the router 120. The table 130 may include additional information such as port numbers to facilitate the unique identification of an end-host 110, even though the end host 110 might not have a unique IP address.

The network communication or transmission protocol registers the application port usage information by an end-host 110 with the table at the local network route 120.

An address resolution service 140 also resides at the local router 120. The PEARS provides port numbers in addition to IP addresses in response to port assignment queries. In an exemplary embodiment, the PEARS utilizes an enhanced DNS look-up service, created through modifications to the DNS protocol. An exemplary implementation is further described below.

Figure 2:
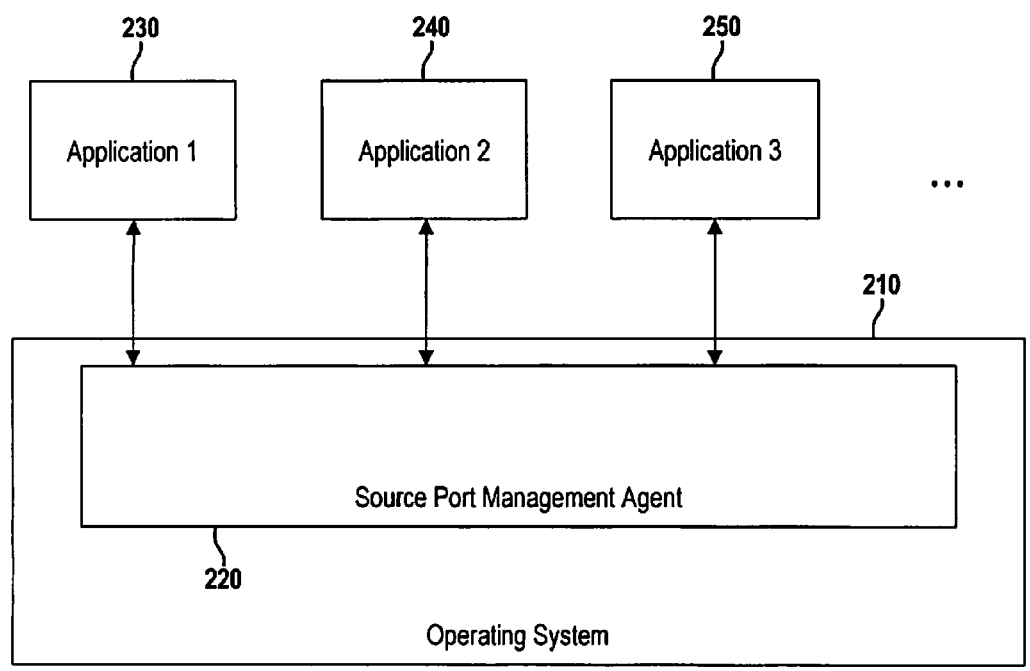
FIG. 2 is a diagram illustrating a source port management agent implemented on an end host.

FIG. 2 illustrates a software module or agent 220 integrated into an operating system 210 of a end-host. Each application on a network end-host 223, 240, and 250 requests and obtains source port values from the operating system 210 residing on the network end-host. These values can either be explicitly requested by the application or randomly assigned by the operating system 210. In order to enable IPv4 address sharing, the range of source port values that are used by each end-host must be limited. This is implemented via the end-host software agent 220 that may residing inside the operating system 210.

In an exemplary embodiment, the software agent 220 has two primary functions. First, the software agent 220 can be configured to intercept all source port requests from applications and to respond with values from fixed ranges. The ability to limit the range of values from which source ports can be used allows the PEARS to reuse the remaining portions of the range on another end-host.

Second, the end-host agent 220 can be configured to register source port usage information as well as its physical MAC address with the local router. This will allow the local router to uniquely identify packets that are intended for this host versus packets that might be intended for another host.

Each end host may be assigned a port range. The port range assigned to each end host could be generated in a number of ways. The port range could, for example, be statically configured at each host, it could be supplied via DHCP, or hosts can be configured to randomly select port ranges and then perform conflict resolution to ensure non-overlapping port allocations.

The second component of the PEARS is the network communication protocol that registers source port usage information with the local router. This protocol, much like the Address Resolution Protocol (ARP), provides a local router with all the information necessary to forward IPv4 packets to the correct physical host. Thus, the protocol should provide any host on the network with enough information to send a data packet to the correct physical host. The network communication protocol builds upon ARP by including both IP addresses and port ranges so that a host can be located. When the local router needs to determine which host is using a particular port, the local router sends out a broadcast request for the information, e.g. PE-ARP_REQUEST. The correct host responds by providing its hardware address and a full local port range.

The network communication protocol of the PEARS can include two distinct functions: the messaging associated with registration and the messaging for on demand lookup.

When an application on an end-host requests and receives a source port from the port range management agent, the agent publishes this information via the modified ARP table maintained at the local router. In one exemplary embodiment, the registration is performed via a simple message sent from the end-host to the router that contains the mapping between IP address, destination port, source port range and the MAC address.

The on-demand lookup messages of the protocol are used in order to discover the mappings between IP addresses, ports and MAC addresses. Before the port range management agent can respond to an application's request for a source port, it must check for potential conflicts. The port range management agent may check with a local information table stored on the end host as well as the address resolution table at the local router. This check can be performed via simple query response messages which seek to determine whether any particular combination of IP address and port ranges is available or not. The address resolution service at the local router transmits a reply to the agent based on the results from the query.

The third component of the PEARS is a modified address resolution table. In an exemplary embodiment, the modified address resolution table may be an extension to the local ARP table. When a packet arrives from the Internet to the local router, the router has to determine the packet's end-host destination. In current networks, the local router stores a mapping between IP addresses and physical MAC addresses. However, this disclosure enables multiple end-hosts to share the same IPv4 address and thus this information is no longer sufficient to uniquely identify the destination end-host for a packet. Instead, a modified table is used which employs both IP addresses and port information to determine the MAC address of the end-host for which the packets are intended.

FIG. 3 illustrates an exemplary embodiment of the modified ARP table. The table 300 lists an IP address 310 that may be used by a plurality of different hosts. In addition to the IP address, the table may include a column 320 for destination ports (which roughly corresponds to a single application), and two columns 330 and 340 for source port values. The source port values are used to specify the range of ports that are associated with a given application. Multiple fields of the IPv4 packet such as IP address, destination and source ports are used in order to determine the MAC address that identifies the packet's final destination, which are shown in column 350. Other data fields needed for routing data packets in a public network may also be included in the table.

The operation of services on well-known ports is a challenge in an environment where the single unique IP address per end-host restriction has been eliminated, such as in IP address-sharing. An IP address and port combination can only be used once. In order to support the use of the same service on multiple end-hosts, an external publication mechanism, such as DNS, can be used. For instance, DNS SRV records can be leveraged for locating service on a end host. An SRV record maps a domain name and a service name to a canonical domain name and a port number.

Any service which is implemented on an end-host would be entered into a modified DNS database table as an entry specifying both the IP address and the port number at which the service was operating. A DNS lookup for this service would then know which IP address and port combination should be used to access that service.

In an exemplary embodiment, the PEARS can be implemented on the Linux kernel version 2.6.29.3. It is appreciated that the PEARS can be implemented on different versions of the Linux kernel, as well as other kernals in general. The following is provided to give an exemplary implementation.

Entries in the Linux kernel ARP table are called neighbours. These entries are hashed by IP address and device (interface) and contain the link-layer (MAC) address of the neighbour. The following is an exemplary data structure for a neighbour:

```
struct neighbour
{
    struct neighbour       *next;
    struct net_device      *dev;
    u8                     nud_state;
    unsigned char          ha[MAX_ADDR_LENGTH];
    struct hh_chache       *hh;
    struct sk_buff_head    arp_queue;
    unsigned short         port_range[2];
    u8                     primary_key[0];
}
``` where, *next is a pointer to the next neighbor in the hash chain, nud_state is a flag that specifies the state of an entry, ha is the hardware address, *hh is a pointer to the hardware leader cache, arp_queue is a queue of packets that require the neighbor entry, primary_key[0] is the IP address, and port_range[2] represents the lower and upper port numbers in the allowed port range. Note that the *hh pointer points to a cache of the entire layer 2 header. Further, it is noted that the IP address in this example is of length 0. This is because neighbours can be allocated using the following: sizeof(struct neighbor)+=PROTOCOL_ADDR_LENGTH.

Generally, when a packet is passed down the networking stack for transmission, the kernel looks up the destination in the modified ARP table. If no entry is found, a new entry is created with primary_key filled in, and the state is set to incomplete. The packet is then pushed onto the arp_queue of the incomplete entry. Every so often, a timer may be triggered to determine the state of the neighbour table entries. Incomplete entries prompt ARP requests to be sent to populate this entry.

Table 1 illustrates an exemplary structure of an ARP packet. When the Linux kernel receives an ARP packet, it first determines if the ARP packet is intended for itself, regardless of the operation (request or reply). It determines this by checking if the Target Protocol Address matches one of its own addresses. If the receiver finds the packet is sent to it, it then performs a lookup in the ARP hash table for the Sender Protocol Address (or creates one if one does not exist). It updates this entry to contain the Sender Hardware Address. If the ARP operation was a request, the receiver then sends a reply, with its hardware address is filled in. For example, the ARP reply is similar to saying '10.0.0.1 is at 00:FE:DC:BA:98:76.' When a neighbour entry is updated by an ARP packet, the arp_queue in the neighbour entry is checked. Any queued packets are pulled off the queue, filled in with the correct link-layer destination and sent to the device for transmission.

TABLE I

| Bit | 0-7 | 8-15 | 16-31 |
| --- | --- | --- | --- |
| 0 | Hardware Type | | Protocol Type |
| 32 | Hardware Len | Protocol Len | Operation |
| 64 | Sender HW Addr | | |
| 96 | Sender HW Addr | | Sender Protocol Addr |
| 128 | Sender Protocol Addr | | Target HW Addr |
| 160 | Target HW Addr | | |
| 192 | Target Protocol Addr | | |

In an exemplary embodiment, the hardware type is link layer protocol and Ethernet is 0x1. The protocol type is Network-layer protocol and IPv4 is 0x0800. The hardware len/protocol len is the size in byes of the link-layer and network layer addresses. The operation is the type of ARP packet, e.g. ARP_REQUEST, or ARP_REPLY. The sender HW addr is the link layer or MAC address of the sender. The sender protocol addr is the network layer or IP address of the sender. The target HW addr is the Link-layer address of the receiver of the ARP packet. Target protocol addr is the network-layer address of the receiver, e.g. the IP address that is being looked up.

The exemplary implementation of the PEARS includes basic mechanisms for the four components described above. The first is a simple mechanism to control source port range allocation at an end host, the second is the actual modified ARP table, the third is the port enabled ARP query/response packets and protocol, and finally the use of DNS-SRV records to demonstrate the operation of servers and not just end hosts in our architecture.

While the PEARS architecture allows for a range of methods to implement source port range allocation to an end host, for the purposes of example, a simple mechanism for manually allocating and configuring these values on a testbed is provided. In Linux, the range of available source ports can be set with the net.ipv4.ip_local_port_range sysctl.

The addition of port numbers to the ARP table can be implemented by modifying the neighbour data structure to include port range information as shown below.

Unsigned short port_range [2];

Port_range [0] is the lowest port number in the range allocated to an end host, and port_range [1] is the upper limit, wherein both numbers are inclusive. These values are both 0 if the entry applies for all ports. It is noted that care must be taken in modifying the neighbour data structure to ensure that the primary_key field is always the last component.

In addition to the modified ARP table discussed above, the ARP query/response packet structures to include port information need to be modified as well. To allow for backwards compatibility, all of the additional information can be appended to the end of the existing ARP packet format, where a flag or predetermined number is used to denote the use of PEARS. Table II shows the additional fields for a modified ARP query/response packet. It is noted that in this embodiment, the additional fields are appended to the regular ARP packet format described in Table I. Both PE-ARP_REQUEST and PE-ARP_REPLY use the same packet format.

TABLE II

| Bit | 0-15 | 16-31 |
| --- | --- | --- |
| 224 | Predetermined Number (0xEAAB) | Sender Port Range Low |
| 256 | Sender Port Range High | Target Port |
| 288 | Return Port | |

Table II illustrates the appended fields to the ARP query or response. The predetermined number is a special designator to indicate to a router that the packet is a PEARS packet. The sender port range high and sender port range low are the bounds of the sender port range. Target port is the port that is being looked up. The target port should not be provided in a range because a sender may not know what range an arbitrary port falls in. In an ARP_REPLY packet, the target port can be a port in the requestor's range. For instance, the target port can be set equal to the sender port range low value. In a ARP_REPLY packet, the return port is the targe port requested in the corresponding ARP_REQUEST packet. In an ARP_REQUEST packet, the return port can be set to the sender port range low value.

With the above data structure and packet format changes in place, the standard ARP processing code in the Linux kernel can be modified so that the kernel is aware at each step. At an end host, a developer should make sure that the destination IP:port range is not in the end host's local ARP cache. As per standard ARP processing, an incomplete entry can be created for that IP address in the ARP table. The port_range can be to be equal to the destination port of the packet that is being sent. An PE-ARP request is then sent, which appears, for example, as follows: "Who has 10.0.1:22? I have 10.0.0.1:100-199 (MAC 00:12:34:56:78:9A)."

On receiving the PE-ARP request a node checks to see if the Target Protocol Address matches its own, and if the Target Port is within its configured range. If both are a match, the node will first update its own PE-ARP table by performing a neighbour entry lookup for the Sender Protocol Address and Return Port and updating this entry with the Sender Hardware Address, and Sender port range, or create it if it does not exist and then finally the node will send the PE-ARP response back to the requester as follows: '10.0.0.1:22 is really 10.0.0.1:10-99 (MAC 00:FE:DC:BA:98:76).'

The modifications described above are sufficient to demonstrate IP address sharing for network configurations involving only end-hosts/client. The modifications alone, however, do not allow for the operation of servers or services that use well known ports in this network. This can however be demonstrated via the addition of the DNS component, as described above. DNS SRV records are well understood and require no changes to BIND to implement other than additional entries in the zone file. Most applications however have not yet opted to use this mechanism for service port location. This change however is minor for most applications. For example, only a single function call in the ssh application needs to be modified to enable a router to correctly lookup which port number sshd on the target server was running on.

During the development of the PEARS, two deployment scenarios were considered. The first is a PE-ARP router and the second is a bridge. As a result, a shared IP address environment in both these scenarios was created by using the foregoing implementation of PEARS. The following describe experiments performed in the deployment scenarios. The following is provided for example only and is not intended to be limiting.

To forward packets to the correct end host, the local last-hop router must also be made port-aware. However, no changes are made to the packet forwarding or routing functions of the router. The only changes that are necessary are to the MAC address lookup capability.

Figure 4:
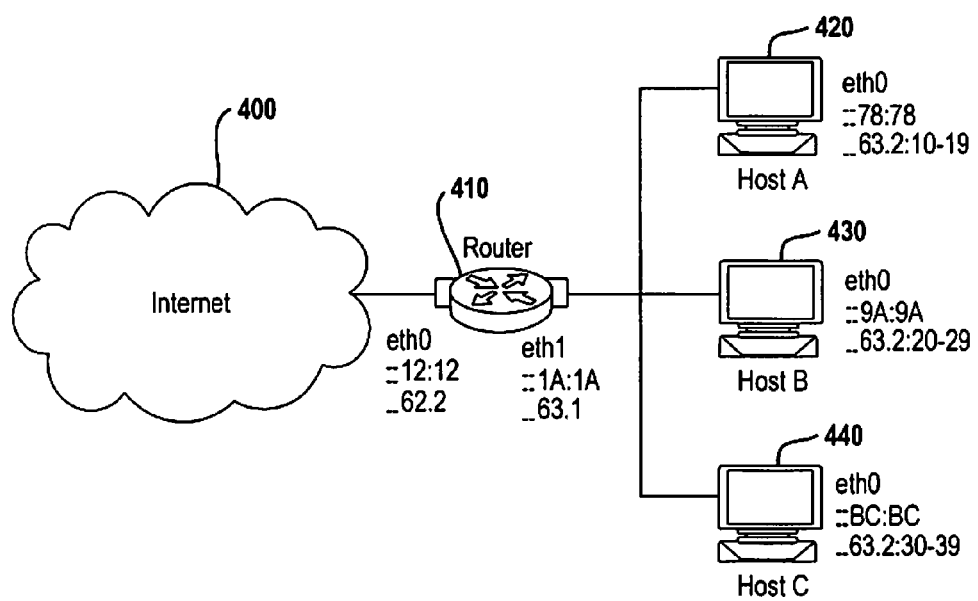
FIG. 4 is a diagram illustrating an exemplary implementation of the address resolution system.

The gateway in this configuration has two physical interfaces each with an IP address on one of the two routed networks. The PEARS aware hosts share one or more IP addresses on the local network (198.108.63.0/24). The router interface IP address on the local subnet itself should not be a shared IP address as this IP address will be used as the next-hop for all outgoing traffic. FIG. 4 shows this basic setup. In the figure, host A 420, host B 430 and host C 440 all share the same IP address, 198.108.63.2. Each host, however, is limited to a port range. Host A 420 is limited from 10-19, host B 430 is limited from 20-29, and host C 440 is limited from 30-39. Using the PEARS, router 410 is able to properly transmit packets sent to a particular host which are received from another device connected to the router via the internet 400.

There are three packet forwarding scenarios to consider; out-going traffic from the end hosts to the Internet, inbound traffic from the Internet 400 to the hosts 420, 430, and 440, and traffic among the hosts 420, 430, and 440 in the local subnet. In the case of outbound traffic, each end host 420, 430, and 440 only allows applications to use ports in its configured port range and then forwards these to the Internet 400 without any additional PE-ARP related processing. Inbound traffic processing may be more involved. In this scenario, the gateway performs a PE-ARP lookup to determine which destination MAC address it should forward an incoming packet to. Any communication between hosts 420, 430, and 440 in the local network can also use PE-ARP lookups to identify the correct targets before sending packets.

For those situations where it is impractical to modify the local router, a PEARS bridge may be implemented. It operates in the same way as a standard Linux bridge except that it implements PE-ARP on the local network side.

PEARS depends on TCP/UDP port numbers to multiplex connections from multiple end hosts. This may create a problem for protocols such as ICMP that do not have port numbers. This can be handled by a PEARS gateway in a way similar to the way NAT devices handle this problem. The gateway can maintain the state of an ICMP query/response by remembering the Query ID on outgoing queries and using it to match up the reply with the intended recipient. The gateway does not have to translate the queries or replies. In alternative embodiments, pseudo-ports may be used. Pseudo-ports could essentially be associated with non port based protocols or applications to allow protocols that do not use port numbers to operate correctly in the PEARS architecture.

Services operating on well-known ports are challenging to accommodate in PEARS. While almost any service can be moved off of its well-known port, making the service port known to the client can be a problem. Wider use of the DNS-SRV record can help. It might also be possible to extend PEARS to allow arbitrary, non-contiguous port ranges so that any port can be assigned to any server. One possible approach is to use DNS SRV records in this scenario to convey service port information to a client application.

Port ranges should be assigned and allocated to hosts and to the PEARS gateway. This potentially creates an additional layer of complexity in the network. An extra DHCP option can be used to hand out the port ranges, but they still must be allocated in some systematic way, and synchronized between the gateway and the hosts. Using DHCP as the basis for port management eliminates the complexity of an additional stand-alone mechanism. The appendix included herein illustrate one possible way to configure a DHCP server and a client can be configured to include a port range option.

While the current approach for the purpose of this prototype implementation is to use fixed manually assigned port ranges, it should be noted that there is currently an Internet draft under consideration at the IETF that proposes a DHCP based port management technique. It is appreciated that the foregoing framework can be applied to implement a DHCP based approach for PEARS.

The foregoing architecture essentially eliminates the concept of well-known ports and replaces it with the notion that any service, in order to be reachable, must publish itself into a database such as DNS.

There are several variations of the proposed invention. The primary embodiment of the invention focuses on the ability to share IPv4 addresses with an underlying assumption that a single IP address would be used for all applications on that end-host. However, the general architecture described could be modified to support the use of multiple IP addresses on each end-host. For example the email application on an end-host could use one IP address and the web-browser could use a different IP address as long as both were within the IP address range configured on the local router.

Finally, the invention could be extended to build an extensive application map of a network for use in firewall configuration settings. As each application in the network must publish itself via a DNS entry, the DNS database becomes a central repository of information regarding what application are permitted on the network. All other applications can simply be blocked at the local router.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

APPENDIX

Server:
Static port range assignments are given in the corresponding "host" declaration of the dhcpd.conf file.

```
host anzi {
    hardware ethernet 00:0a:e4:3c:d7:c3;
    fixed-address 192.168.3.57;
    option port-range "10000-11000";
}
```

Dynamic port ranges are allocated out of a pool. Since all clients using a port range from a given pool share the same IP address, the "range" declaration only includes one IP address. The number of ports to hand out to each client is given in a "port-chunksize" declaration.
This is a set of PE-ARP hosts with a single IP address and multiple port
ranges. The ranges start at 12000 and have 1000 ports each.

```
Subnet 192.168.0.0 netmask 255.255.252.0 {
    range 192.168.3.57:12000-15000;
    port-chunksize 1000;
}
```

Client:
The dhclient.conf file specifies a request for the "port-range" option, either in the "request" declaration or as an "also request":
Request subnet-mask, broadcast-address, time-offset, routers, domain-name, domain-name-servers, domain-search, host-name, netbios-name-servers, netbios-scope, interface-mtu, rfc3442-classless-static-routes, ntp-servers, port-range;
or
also request port-range;

What is claimed is:

1. An address resolution system for a plurality of network devices arranged to share a common public network address in a public network environment, comprising:
an address resolution table residing in a computer memory associated with a router and configured to store a public network address and a source port assigned to each network device registered with the router in connection with a hardware address that uniquely identifies each of the registered network devices;
a port management agent embodied as computer executable instructions residing on a given network device, the agent configured to receive a request to assign a source port to an application residing on the given network device and transmit the assignment request to the router; and
an address resolution service embodied as computer executable instructions residing at the router, the address resolution service configured to query the address resolution table in response to the assignment request from the agent and transmit a reply to the agent based on results from the query of the address resolution table.

2. The address resolution system of claim 1 wherein the port management agent provides the requesting application with a source port assignment based on the reply received from the address resolution service.

3. The address resolution system of claim 2 wherein the port management agent registers the source port assignment with the router.

4. The address resolution system of claim 2 wherein the requesting application formulates and transmits a data packet in the public network environment using the public network address and a source port from the source port assignment.

5. The address resolution system of claim 1 wherein the port management agent resides in an operating system on the given network device and intercepts the assignment requests sent from an application to the operating system residing on the given network device.

6. The address resolution of claim 1 wherein the source port assignment is further defined as a range of source ports that are associated with a given network device.

7. The address resolution system of claim 1 wherein the public network address is further defined as an Internet Protocol (IP) address and the hardware address is further defined as a Media Access Control (MAC) address.

8. A method for transmitting data packets across a public network using a shared public network address, comprising:
transmitting a request for a source port from a requesting network device to a router shared by a plurality of network devices;
querying an address resolution table on the router for an unassigned source port in response to the port request from the given network device, where the address resolution table stores the public network address and a source port assigned to each network device registered with the router in connection with a hardware address that uniquely identifies each of the registered network devices; and
transmitting a reply from the router to the requesting network device, the reply includes an unassigned source port for use by the requesting network device; and
transmitting data packets from the requesting network device across the public network using the public network address and the unassigned source port.

9. The method of claim 8 wherein the public network address is further defined as an Internet Protocol (IP) address and the hardware address is further defined as a Media Access Control (MAC) address.

10. The method of claim 8 further comprises intercepting a port assignment request sent from an application residing on the requesting network device to an operating system residing on the requesting network device and transmitting the request to the router.

11. The method of claim 8 further comprises registering the unassigned source port with the address resolution table.

12. The method of claim 11 further comprises transmitting a registration message having the public network address, the unassigned source port and the hardware address for the requesting network device from the requesting network device to the router.

13. The method of claim 12 further comprises creating an entry in the address resolution table based on the registration message.

14. The method of claim 8 further comprises routing data packets arriving at the router over the public network to applicable network devices using the address resolution table.

15. A method for routing data packets by a router in a public network environment, comprising:

storing an address resolution table in a computer memory associated with the router, where the address resolution table maps a public network address and a source port assigned to network devices registered with the router to a hardware address that uniquely identifies each of the registered network devices;

publishing source port assignments from the address resolution table in response to queries from network devices in the public network;

registering source port assignments from network devices with the address resolution table; and routing data packets arriving at the router over the public network to applicable network devices using the address resolution table.

16. The method of claim 15 wherein publishing source port assignments further comprises receiving a request for a source port at the router from a requesting network device; querying the address resolution table on the router for an unassigned source port; and transmitting a reply from the router to the requesting network device, the reply includes an unassigned source port for use by the requesting network device.

17. The method of claim 15 wherein the registering source port assignments further comprises receiving a registration message having a public network address, an unassigned source port for the public network address and a hardware address for the requesting network device; and creating an entry in the address resolution table based on the registration message.

18. The method of claim 15 wherein the public network address is further defined as an Internet Protocol (IP) address and the hardware address is further defined as a Media Access Control (MAC) address.

\* \* \* \* \*